(12) United States Patent
Farmer

(10) Patent No.: US 6,768,448 B2
(45) Date of Patent: Jul. 27, 2004

(54) APPARATUS AND METHOD FOR TIME MAINTENANCE IN A SATELLITE POSITION SYSTEM RECEIVER

(75) Inventor: Dominic Farmer, Los Gatos, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/280,477

(22) Filed: Oct. 24, 2002

(65) Prior Publication Data

US 2004/0021601 A1 Feb. 5, 2004

Related U.S. Application Data

(60) Provisional application No. 60/400,670, filed on Aug. 2, 2002.

(51) Int. Cl.[7] .............................................. H04B 7/185
(52) U.S. Cl. ................................................. 342/357.06
(58) Field of Search ....................... 342/357.01, 357.06, 342/357.12, 352; 701/213, 215

(56) References Cited

U.S. PATENT DOCUMENTS

2003/0154025 A1 * 8/2003 Fuchs et al .................. 701/213

* cited by examiner

*Primary Examiner*—Dao Phan
(74) *Attorney, Agent, or Firm*—Philip Wadsworth; Charles Brown; Richard Bachand

(57) ABSTRACT

A system for maintaining time in a satellite positioning system (SPS) receiver that relies on almanac data to maintain a reasonably accurate time. The approximate time based on almanac data is sufficiently accurate to bound the unknown parameters when a request for position is received. The receiver may automatically update the internal time and/or position. When a time update is required, the approximate time based on almanac data is sufficiently accurate that the receiver need only acquire the code phase from the satellites and can internally determine the code period into the bit and the bit into the week based on the almanac data.

21 Claims, 4 Drawing Sheets

SUBFRAME #

| 1 | TLM | HOW | SV CLOCK CORRECTION DATA |
|---|---|---|---|
| 2 | TLM | HOW | SV EPHEMERIS DATA (1) |
| 3 | TLM | HOW | SV EPHEMERIS DATA (2) |
| 4 | TLM | HOW | OPERATIONAL DATA |
| 5 | TLM | HOW | ALMANAC DATA |

...

| 4 | TLM | HOW | ALMANAC DATA |
|---|---|---|---|
| 5 | TLM | HOW | ALMANAC DATA |

(PRIOR ART)
FIG. 2

APPARATUS AND METHOD FOR TIME MAINTENANCE IN A SATELLITE POSITION SYSTEM RECEIVER

RELATED APPLICATIONS

This application claims priority to U.S. Provisional Application Serial No. 60/400,670 filed on Aug. 2, 2002.

BACKGROUND

1. Technical Field

The present description relates generally to satellite positioning system receivers and, more particularly, to an apparatus and method for time maintenance within a satellite positioning system receiver.

2. Description of the Related Art

Satellite positioning systems, such as the global positioning system (GPS) use a plurality of satellites to calculate the position of a GPS receiver. The GPS receiver may be in a fixed location, in a mobile location such as an automobile or ship, or incorporated into a handheld device. In some cases, the GPS receiver is integrated with a wireless communication device, such as a cellular telephone or personal communications system (PCS) device.

FIG. 1 is a block diagram depicting the operation of a conventional GPS receiver 10 having an antenna 12. The receiver 10 receives signals from a plurality of satellites 14–20 via wireless communications links 22–28, respectively. Based on time of arrival measurements from the satellites 14–20, the GPS receiver 10 is able to accurately calculate its position in three-dimensional space. The accuracy of the position determined by the GPS unit 10 requires accurate timing information so that the position of the satellites 14–20 are precisely known.

Typically, the GPS receiver 10 generates a highly accurate time estimate as part of the navigation fix. The GPS receiver 10 receives ephemeris data and time information from a plurality of satellite vehicles (SV). The time at which each SV transmits data may be referred to herein as "signal time" to indicate the time at which the data signal was transmitted from the SV. In contrast, the term "real-time" is used herein to refer to the local time maintained with in the GPS receiver. As those skilled in the art will appreciate, there is a propagation time delay of approximately 60–80 milliseconds depending upon the distance between the SV in the GPS receiver 10. The difference between the signal time and the real time is sometimes referred to as the pseudorange. Given the ephemeris data and signal time from a plurality of SVs, the GPS receiver 10 processes the data using known formulas in an effort to minimize the residual values in three-dimensional space and time. That is, the GPS receiver 10 computes a (x, y, z) and t estimates for the receiver; where (x, y, z) are the ECEF coordinates that represent the receiver position and t represents the GPS time of applicability of the measurements used to form that position. The accuracy of this time estimate is typically better than 1 microsecond.

In a conventional embodiment, the GPS receiver 10 derives time signals from the data stream transmitted from the satellites (e.g., the satellites 14–20). However, deriving accurate time from such transmissions is time consuming and requires that the received signal power is sufficient to permit data demodulation. Alternatively, wireless assisted GPS receivers may communicate with reference assisted networks in which GPS receivers that form the network utilize pattern matching techniques in an attempt to identify the data frame timing information. Although a wireless assisted network may permit the GPS receiver 10 to recover lost timing information, the use of wireless networks requires additional communication links that are not always available.

Those skilled in the art will appreciate that ephemeris data has a relatively short-lived validity and must be updated frequently. Typically, the validity of ephemeris data is questionable after just a few hours. Thus, the conventional GPS receiver 10 must frequently update its ephemeris data base to maintain the orbital computation accuracy required for proper position determination. Such frequent updates are very time consuming for the GPS receiver 10. Therefore, it can be appreciated that there is a significant need for a system and method to provide accurate positioning and time information without the need for frequent updates. The apparatus and method described herein provides this and other advantages as will be apparent from the following detailed description and accompanying figures.

BRIEF SUMMARY

The present invention is embodied in a system and method for time maintenance in a satellite positioning system receiver. In one embodiment, the apparatus for time maintenance in a satellite positioning system receiver configured to receive data from a plurality of satellites comprises a processor coupled to the receiver to receive data therefrom. The processor derives almanac data from the received satellite data. The apparatus further comprises a clock to maintain a time based at least in part on the almanac data.

In one embodiment, the clock may be configured to use the almanac data to derive a code period into a current data bit. The clock may also use the almanac data to derive a data bit into a current week.

In one embodiment, the processor is configured to determine an estimated time based on a plurality of parameters and the almanac based time is used to provide an indication of at least one of the plurality of parameters. The estimated time may be based on code phase, code period into a current bit and a bit into a current week. The processor may measure the code phase based on the received satellite data and use the almanac based time to provide an indication of at least one of the code period into the current bit and the bit into the current week.

BRIEF DESCRIPTION OF THE DRAWING(S)

FIG. 2 illustrates the data format used by GPS satellites.

DETAILED DESCRIPTION

Figure 1:
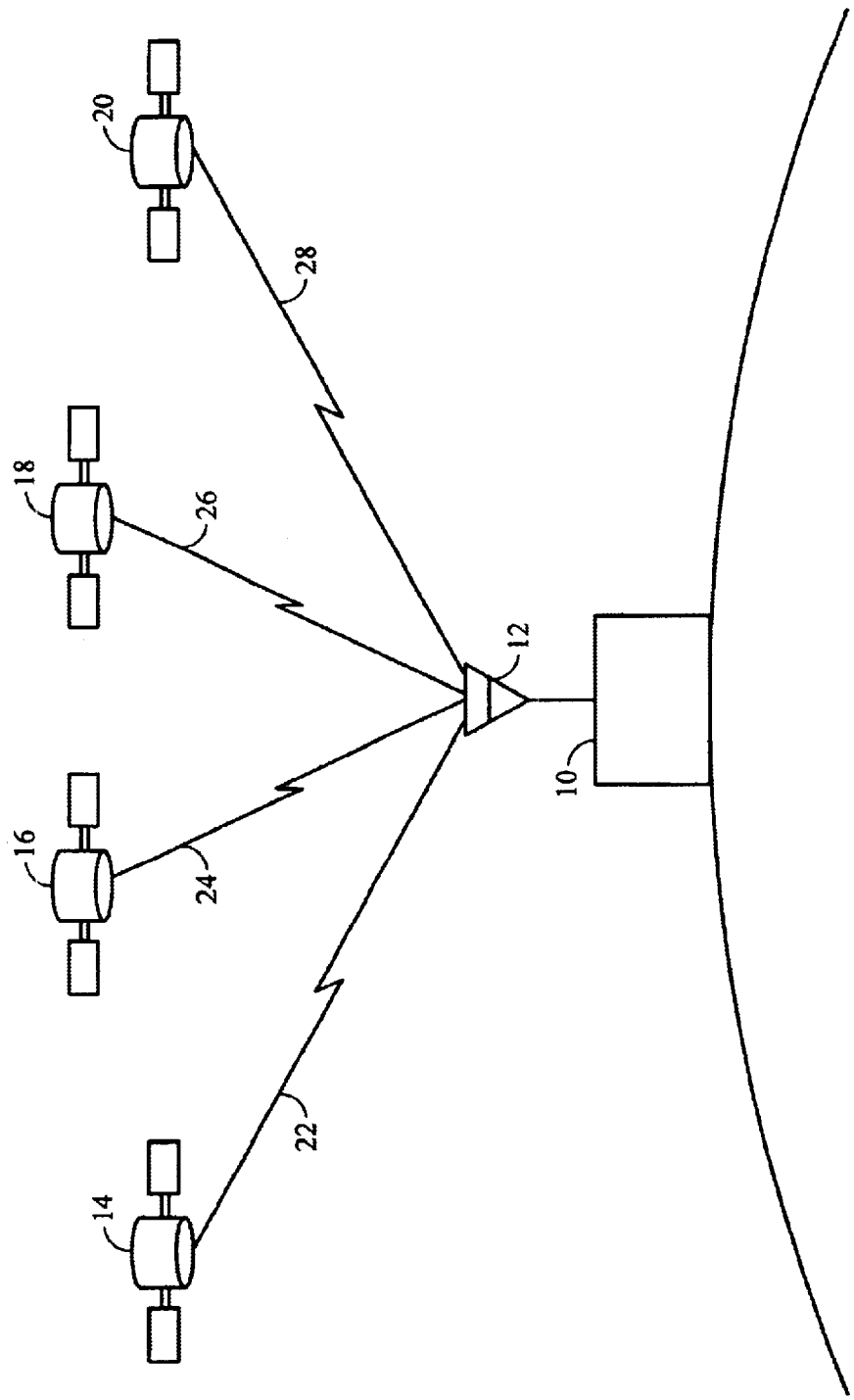
FIG. 1 is a schematic illustrating a typical global positioning system (GPS) receiver and satellites.

The apparatus and method described herein relate to the use of almanac data as a reference source for the computation and maintenance of time within a receiver. A satellite positioning system (SPS) utilizes a plurality of satellites in known orbits. One such known system is the global positioning system (GPS). With GPS, the satellites orbit the earth and transmit data. The data transmitted by each satellite may generally be categorized as timing data, ephemeris data and almanac data. In addition, other maintenance data may be transmitted. However, this maintenance data does not relate to the techniques described herein.

As described above, it is critical that the GPS receiver have an accurate internal time since the position determination requires an accurate knowledge of satellite position and an accurate knowledge of the signal transmit time (i.e., the signal time). A brief discussion of conventional time derivation using satellite data will assist the reader in a proper understanding of the techniques described herein to maintain internal time within the GPS receiver using almanac data.

For an accurate determination of time, the GPS receiver must acquire signals from multiple satellites. The GPS receiver must determine the code phase of the received signal, the code period into the bit, and the bit into the week. These three measurements may be analogized to seconds, minutes and hours. The code phase acquisition requires the GPS receiver to lock onto the pseudo random noise (PRN) code transmitted by the satellite vehicle (SV). The code phase, sometimes referred to as a coarse acquisition (C/A) code, has 1,023 chips in a code period. The C/A code is transmitted at a chipping rate of 1.023 MHz, resulting in a repetition rate of 1 millisecond (ms). There are 20 code periods in a data bit, resulting in a 50 Hz data rate. In a typical operation, measurement of the code phase is a relatively straight forward operation that requires only a brief period of time under normal operational conditions.

The code period into the bit is a more difficult timing relationship to ascertain. Under ideal conditions, the GPS receiver has a high signal-to-noise ratio. Under these ideal conditions, the GPS receiver analyzes the relative phase change between adjacent 1 millisecond coherent sums in determine the data bit edge position. Data bit transitions occur every 20 ms. Once an edge is detected, it is possible to track the data bit transitions and determine the code period into the bit. Unfortunately, such ideal conditions often do not exist. Under more typical operating conditions, the signal-to-noise ratio is low and the GPS receiver cannot reliably detect each bit transition using this simple technique. Rather, bit transitions are averaged and analyzed using subsequent signal processing techniques to determine the code period into the bit. Under poor operating conditions, the determination for the code period into the bit can take several seconds before a reliable estimate can be ascertained.

The determination of the bit into the week is also a time consuming process. FIG. 2 illustrates the format of data transmitted from the SV. The data to be transmitted by the SV is broken into subframes, each of which comprises 300 data bits. At a data transmission rate of 50 bits per second, the SV transmits a subframe in 6 seconds. As illustrated in FIG. 2, subframes 1–3 contain clock correction data and ephemeris data. Subframes 4 and 5 contain additional operational data and almanac data. The five subframes comprise a single frame, which is transmitted in 30 seconds. Due to the length of the almanac data, subframes 4 and 5, containing additional almanac data, are transmitted in subsequent frames with a total of 25 frames being transmitted in a period of 12.5 minutes.

As illustrated in FIG. 2, each of the subframes contains a header comprising telemetry data (TLM) and a hand over word (HOW). The HOW comprises 30 bits. Seventeen of the bits are truncated time of week data and indicate the time of week count for the next data frame to be transmitted. The GPS receiver 10 (see FIG. 1) synchronizes to the data frame, decodes the received data and multiplies the 17-bit value of the HOW by 6 seconds (i.e., the transmission time of a subframe) to determine the number of seconds into the week. The number of seconds into the week is multiplied by 50 (i.e., the data transmission rate of 50 bits per second) to determine the number of bits into the week. The process of frame synchronization and HOW identification is also time consuming and may take 15–20 seconds under poor operating conditions. Thus, a complete time measurement can take more than 20 seconds under poor operating conditions. Once an accurate signal time for several satellites has been established within the GPS receiver, the position of the GPS receiver may be determined to within a few meters. As previously noted, the GPS receiver minimizes the residual values for the three-dimensional coordinates of the receiver (i.e., the x, y, and z coordinates). The GPS receiver also minimizes the residual value for time, thus enabling an accurate determination of real time (i.e., the time maintained by the GPS receiver).

As previously noted, ephemeris data is considered accurate for only a brief period of time. Thus, the process of updating the ephemeris data base in the GPS receiver must be repeated every 2–4 hours to maintain the desired level of accuracy. In an alternative embodiment, ephemeris data may be supplied to the GPS receiver from an external reference network. Such reference networks are known in the art and need not be described in greater detail. However, even with reference network assisted data, the GPS receiver must still determine real time with a high degree of precision in order to accurately determine its location based on the network provided ephemeris data. Thus, the use of networks does not automatically improve the position determining response time of the GPS receiver.

The present techniques described herein allow the GPS receiver to maintain a real time estimate based on almanac data received from the SVs.

Those skilled in the art will appreciate that the almanac data provided in the GPS is used conventionally to determine which satellites are in view of the GPS receiver and the approximate location of those satellites. In addition, the almanac data indicates which satellites actually exist. There are defined configurations for 32 satellites in the GPS constellation, but not all satellites are in orbit. For example, there are presently approximately 24 GPS satellites in orbit. The almanac data is used to indicate to the GPS receiver which satellites are in orbit and thus available for the location determining process. In addition, the almanac data can be used to indicate which of the orbiting satellites are in good working condition (i.e., are designated as "healthy"). It should be noted that almanac data is not intended for time maintenance or for position determination.

While almanac data alone is insufficient to perform an accurate position determination, the advantage of almanac data is that it maintains a satisfactory accuracy for months. As will be described in greater detail below, the GPS receiver described herein maintains a reasonably accurate time using almanac data and, when necessary, can calculate the signal time (i.e., the time at which signals were transmitted from the satellite) more quickly than a conventional GPS receiver. This is due to the fact that the almanac data can be used to determine the code period into the bit and the bit into the week based on the almanac time and does not require the long processing time typically associated with processing the signal directly to derive this timing information. Thus, the GPS receiver described herein can simply measure the code phase, which takes a relatively short time, and combine this with the almanac derived bit in week and code period in bit estimates, to determine the real time with the desired degree of accuracy. Position determination can then be performed using conventional techniques that involve satellite measurements or the use of ephemeris data provided by a reference network.

Figure 3:
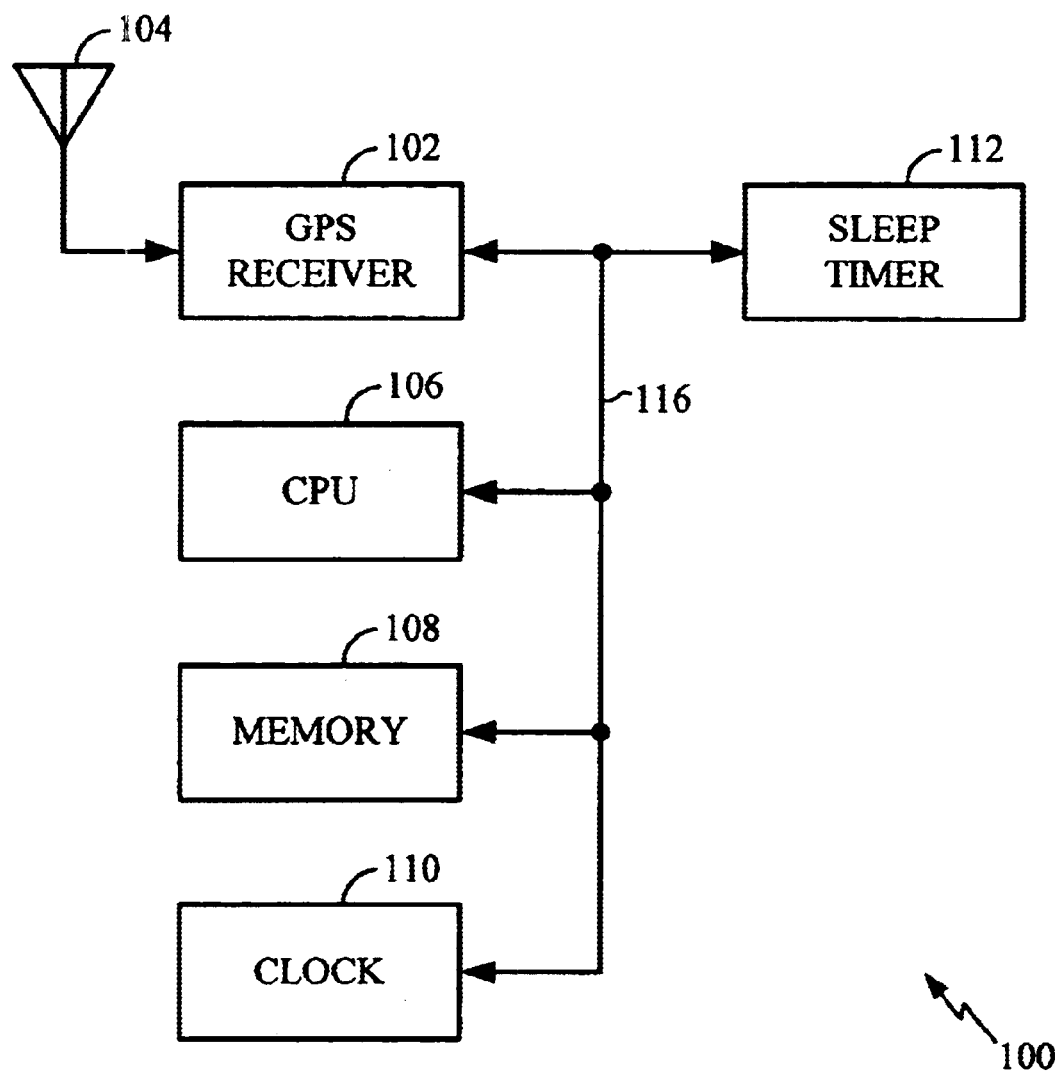
FIG. 3 is a functional block diagram of an example embodiment of a receiver constructed in accordance with the present description.

FIG. 3 is a functional block diagram of a system 100 constructed in accordance with the teachings contained herein. The system 100 includes a GPS receiver 102, which is coupled to an antenna 104 and receives signals therefrom. The operation of GPS receivers is known in the art and need not be described herein. Similarly, GPS antennas, such as used to implement the antenna 104, are known in the art and need not be described herein.

The system 100 also includes a central processing unit (CPU) 106 and a memory 108. Those skilled in the art will recognize that the CPU 106 may be implemented satisfactorily in a number of different ways. For example, the CPU 106 may be implemented as an imbedded processor, controller, application specific integrated circuit (ASIC), digital signal processor (DSP), discrete hardware components, or the like. The term CPU is intended to describe the functions implemented by the system 100 rather than a specific hardware limitation.

The system 100 also includes a clock 110, which is used in conjunction with the GPS receiver 102 to maintain an accurate time for position determination, as described above. The system 100 may optionally include a sleep timer 112 that would allow the system 100 to enter a sleep mode in which the GPS receiver 102 does not continuously track the SV signalsAs will be described in greater detail below, the sleep timer 112 may periodically "wake up" or activate the system 100 to perform a time and/or position update. The various components described above are coupled together by a bus system 116, which may comprise a data bus, control bus, power bus, and the like. For the sake of simplicity, these various buses are described herein as the bust system 116.

As previously discussed, the conventional GPS receiver must have an accurate real time clock in order to provide the desired accuracy in position determination. This requires the determination of code phase, code period into the bit, and bit into the week calculations for all SVs used in the position fix. The latter two calculations are time consuming, particularly under typical operating conditions in which the GPS receiver receives jammed signals or signals with a low signal to noise ratio (SNR).

In contrast, the clock 110 in FIG. 3 maintains a reasonably accurate real time clock, which eliminates the need for calculation of code period into the bit and bit into the week. Thus, the GPS receiver 102 need only determine the code phase and then combine code phase information with the code period into the bit and the bit into the week to accurately determine the signal time. When an accurate real time is determined as a result of the position fix, the clock 110 may be updated to the correct time. In addition, with the approximate time maintained by the clock 110, the system 100 essentially has a head start on calculations of satellite positions and GPS receiver position since the uncertainties in the calculations are now bounded due to the reasonably accurate almanac time maintained within the system 100. Using the almanac data to bound the uncertainties allows new satellite positions and the position of the GPS receiver to be quickly determined.

As previously noted, real time based on almanac data is only sufficient to determine the location of the GPS receiver 102 within 4–5 km. This distance error translates to approximately a 15 code chip error in the 1,023 code chips in the PRN code. Given the limited range of error, acquisition of the code phase may be accomplished readily by the system 100.

Figure 4:
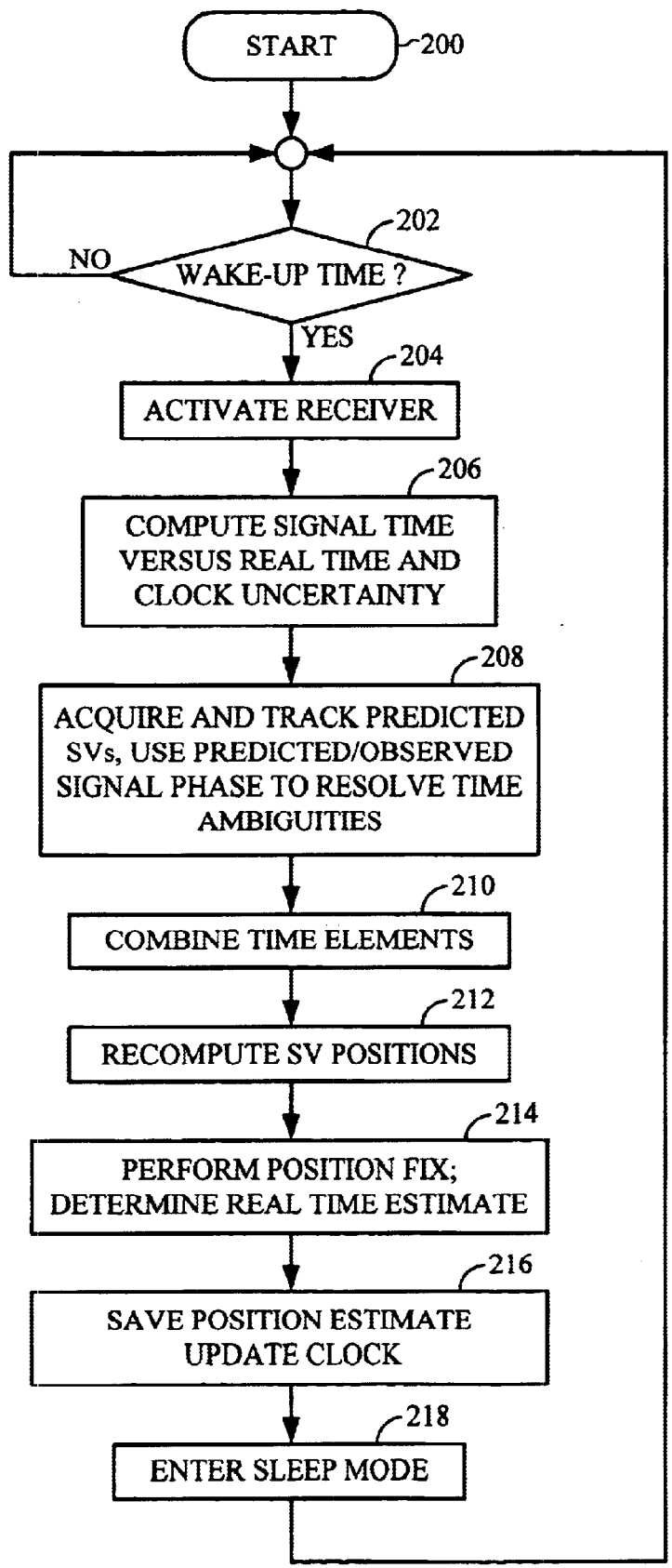
FIG. 4 is a flowchart illustrating the operation of the system of FIG. 3.

The operation of the system is illustrated in the flow chart of FIG. 4. At a start 200, it is assumed that the system 100 (see FIG. 3) is under power. In decision 202, the system 100 determines whether the wake-up time period has expired. If the wake-up time period has not expired, the result of decision 202 is NO, and the system 100 returns to decision 202 until the wake-up time period has expired.

The sleep timer 112 can be set to automatically update the real time estimate and, if desired, the current position of the GPS receiver 102. For example, the sleep timer may periodically activate the system 100 only to update the real time clock 110. The clock update rate depends on the stability of the clock. The updates should be scheduled frequently enough so that timing ambiguities can be resolved. Real time clock updates may be performed, by way of example, every 2–4 hours. Position updates may also be automatically performed when the system 100 is activated by the sleep timer. The clock update and position update can be based on almanac data, as discussed below. When an accurate position fix is required by the user, ephemeris data is used for the position fix and the clock 110 (see FIG. 3) can be updated with a highly accurate real-time estimate.

Real time clock and/or position updates may also be manually initiated. For example, a user can activate a button (not shown) on the GPS receiver 102 to determine the current position. Based on the elapsed time since the last real time clock update, the system 100 may imitate an update for the clock 100. If the clock update was recently performed, a new update may not be necessary. If a real time clock update is necessary, the remaining process illustrated in FIG. 4 may be performed.

When the wake-up time period has expired, the result of decision 202 is YES. In that event or if a manual update has been initiated, in step 204 the system 100 activates the GPS receiver 102 (see FIG. 3). In step 206, the system 100 determines the uncertainty of the clock 110 (see FIG. 3). In a typical implementation, the system 100 performs a position fix before going into the sleep mode. In that case, the clock 110 had a value, T, that was an every accurate time estimate before going into the sleep mode. Upon activation of the GPS receiver 102 in step 204, the system 100 looks at the elapsed time $\Delta T$. That is, the system 100 determines how long the GPS receiver was in the sleep mode. The length of time in the sleep mode combined with the inherent accuracy of the clock allows the system 100 to make a determination of the time estimate error. For example, if 500 seconds has elapsed since the last position fix (i.e., $\Delta T=500$ seconds) and the internal oscillator (not shown) of the clock 110 has an error rate of one part per million (ppm), the clock 110 is accurate to within ±500 microseconds. Similarly, if the oscillator in the clock 110 has an error rate of 0.1 ppm, the clock has a maximum error of ±50 microseconds in the example above. Those skilled in the art will appreciate that shorter elapsed times (e.g., less than 500 seconds) will result in a lower absolute time error for a given error rate of the oscillator in the clock 110. The system 100 may an error threshold value below which it is not necessary to update the clock 110. For example, if the last position fix occurred only a few seconds ago, the maximum error in the clock 110 is likely to be quite low and a clock update is not warranted.

In step 208, the GPS receiver 102 (see FIG. 3) acquires the code phase from one or more SVs. As discussed above, code phase acquisition is a relatively straightforward process that consumes little time when compared with the acquisition time required to determine the code period into the bit and the bit into the week.

The system 100 can compute the SV positions and a predicted SV observed code phase based upon stored position data, the computed time in the clock 110, and almanac or ephemeris data. For example, assume the clock 110 had a value T, which is very accurate based on the previous position fix. The current time may be considered T+ΔT, which is the accurate real time estimate, plus the elapsed time since the last position fix. As noted above, the value for ΔT may have some uncertainty based on the length of the elapsed time and the accuracy of the oscillator (not shown) in the clock 110. Based on the time value T+ΔT, the GPS receiver 102 can compute the SV positions, the predicted SV range and thus the predicted SV code phase.

Those skilled in the art will appreciate that the SVs will have moved within their predicted orbital paths since the last position fix. In addition, the GPS receiver 102 may have moved since the last position fix. However, movement of the GPS receiver is generally negligible when compared with the movement of the satellites. In a typical orbital path, the line of sight SV range can change by as much as 1 kilometer per second (e.g., approximately 3,600 kilometers per hour).

Based on these predictions, the system 100 must acquire and track as many of the predicted SV signals as possible within a preprogrammed time out period. The GPS receiver measures the code phase and uses the predicted code phase to resolve code period in the bit and the bit in the week ambiguities. Two examples of this process are illustrated below in Tables 1 and 2.

TABLE 1

| Data value | Predicted | Actual (Measured) |
|---|---|---|
| Bit into Week | 10 | — |
| Code Period into Bit | 5 | — |
| Code Phase | 0.9 | 0.95 |

In the example of Table 1, the predicted value for the bit into the week is 10, while the code period into the bit in this example is 5. The predicted code phase is 0.9 based on the elapsed time since the last position fix and the accuracy of the clock 110 (see FIG. 3). The actual code phase measured for a particular SV in the example illustrated in Table 1 is 0.95. This indicates that the predicted values for the bit into the week and the code period into the bit are correct. Thus, the system 100 has made reasonably accurate determination of the unambiguous SV signal time while only having to measure the code phase.

The example of Table 2 illustrates the process for a different predicted code phase.

TABLE 2

| Data value | Predicted | Actual (Measured) |
|---|---|---|
| Bit into Week | 10 | — |
| Code Period in Bit | 5 | — |
| Code Phase | 0.1 | 0.95 |

In this example, the predicted value for the bit into the week is 10, while the predicted code period into the bit is 5. In this example, the predicted code phase is 0.1, while the actual measured code phase in this example is 0.95. The difference between the predicted and actual code phases in the example of Table 2 indicates that the actual value for the code period into the bit is 4, rather than 5 since this setting represents the smallest time difference between the unambiguous prediction and the ambiguous measurement(5.1−4.95=0.15 code period residual). Again, the system 100 has made a time determination based on the stored data and the measured code phase.

In step 210, the system 100 combines the various time elements to establish real time at the GPS receiver with a high degree of accuracy. The use of almanac data to resolve the most difficult timing elements to determine (i.e., the code period into the bit and the bit into the week) allow the GPS receiver 102 to quickly determine real time with a high degree of accuracy.

In step 212, the system 100 uses the almanac data to recompute the SV positions based on the measured SV code phase. In step 214, the system develops pseudorange estimates based on the measured code phase and the almanac derived code period into the bit and the bit into the week. The subsequent position fix is a conventional technique that need not be described herein. The position fix is less accurate than a position fix based entirely upon ephemeris data and may have an error on the order of a few kilometers due to the fact that it is based in part on almanac data. The real time estimate based on almanac data calculations is also less accurate than a real time estimate based only upon ephemeris data. However, time maintenance based on the almanac data does not require frequent updates and the time estimate is reasonably accurate to within approximately 10 microseconds. In the example above where the clock was accurate to ±500 microseconds, the error range has been brought down to 10 microseconds. Alternatively, the position fix can be calculated with ephemeris data using the code period into the bit and the bit into the week based on the almanac data, as described above. Use of ephemeris data provides a more accurate position fix and real time estimation.

In step 216 the system 100 saves the new position estimate and code phase relationship between the real time and the signal time. In the example described herein, the use of almanac-derived data maintains the clock 110 with reasonable accuracy and permits the estimation of real time by measuring the code phase from an SV while using the stored timing data to determine the code period into the bit and the bit into the week. Use of this timing data along with stored almanac data permits the updating of the clock to a reasonable accuracy (e.g., approximately 10 microseconds). Use of this timing data along with received ephemeris data permits a more accurate position fix and a very accurate real time estimate, which permits the updating of the clock 110 to a high degree of accuracy.

Those skilled in the art will appreciate that the calculation of the position of the GPS receiver 102 uses a set of mathematical equations in which the signal time and the real time are provided as inputs. In the present system, selected elements of the real time data are provided by the clock 110 based on almanac data. Specifically, the periods into the bit and the bits into the week are maintained by the clock 110 based on almanac data. Thus, the system 100 maintains the time elements which are most difficult to obtain from the SVs.

In step 218, the system 100 enters a sleep mode. While in the sleep mode, the clock 110 (see FIG. 3) maintains the real time, which was based on the combination of almanac data and the update provided by the acquired code phase in step 208. Following the operation of step 216, the system 100 returns to decision 202 to await the next awake cycle. Those skilled in the art will recognize that a variety of alternative embodiments are possible. For example, the sleep mode may be manually interrupted by user activation of a button (not shown) to acquire the real time, or to determine the position of the GPS receiver 102. If manual intervention is permitted, the system 100 moves immediately to step 204 and executes steps 204–212 in the manner described above. Alternatively, the system 100 may automatically enter and exit sleep mode, as illustrated in FIG. 4, to periodically update the real time clock 110 based on the stored almanac data and acquired code phase data.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. An apparatus for time maintenance in a satellite positioning system receiver configured to receive data from a plurality of satellites, the apparatus comprising:
   means for maintaining stored timing data for use by the receiver
   means associated with the receiver for using the stored timing data to acquire communication signals from at least one satellite vehicle;
   processing means for deriving a first portion of timing information using the acquired communication signals, the processing means deriving a second portion of timing information using the stored timing; and
   means for combining the first and second portions to determine a real time estimate.

2. The apparatus of claim 1, further comprising means for performing a position fix using the real time estimate.

3. The apparatus of claim 2 wherein the position fix is performed using almanac data.

4. The apparatus of claim 3, further comprising means for determining a new real time estimate.

5. The apparatus of claim 2 wherein the position fix is performed using ephemeris data.

6. The apparatus of claim 1 wherein the means for storing timing information comprises means for storing data related to a code period into a current data bit.

7. The apparatus of claim 1 wherein the means for storing timing information comprises means for storing data related to a data bit into a current week.

8. The apparatus of claim 1 wherein the receiver is selectively operated in an active mode and a sleep mode and the means for maintaining stored timing data maintains the stored timing data in both the active mode and the sleep mode, and the means associated with the receiver for using the stored timing data to acquire communication signals using the stored timing data to acquire communication signals occurring upon entry from the sleep mode into the active mode.

9. A method for time maintenance in a satellite positioning system receiver configured to receive data from a plurality of satellites, the method comprising:
   maintaining stored timing data;
   using the stored timing data to acquire communication signals from at least one satellite vehicle;
   using the acquired communication signals to derive a first portion of timing information;
   using the stored timing data to derive a second portion of timing information; and
   combining the first and second portions to determine a real time estimate.

10. The method of claim 9, further comprising performing a position fix using the real time estimate.

11. The method of claim 10 wherein the position fix is performed using almanac data.

12. The method of claim 11 wherein the position fix comprises determining a new real time estimate.

13. The method of claim 10 wherein the position fix is performed using ephemeris data.

14. The method of claim 13 wherein the position fix comprises determining a new real time estimate.

15. The method of claim 9 wherein the stored timing information comprises a code period into a current data bit.

16. The method of claim 9 wherein the stored timing information comprises a data bit into a current week.

17. The method of claim 9 wherein the stored timing data is based on a plurality of parameters and almanac data is used to provide an indication of at least one of the plurality of parameters.

18. The method of claim 17 wherein the stored timing data is based on code phase, a code period into a current bit and a bit into a current week.

19. The method of claim 18 wherein deriving the first portion of timing data comprises measuring the code phase based on the acquired communication signals.

20. The method of claim 18 wherein deriving the second portion of timing data comprises using the code phase based on the acquired communication signals to determine the accuracy of the stored timing data, the stored timing data comprising at least one of the code period into the current bit and the bit into the current week.

21. The method of claim 9 wherein the receiver is selectively operated in an active mode and a sleep mode and maintaining stored timing data occuring in both the active mode and the sleep mode, and using the scored timing data to acquire communication signals occurring upon entry from the sleep mode into the active mode.

* * * * *